(12) United States Patent
Kurashima et al.

(10) Patent No.: US 8,489,471 B2
(45) Date of Patent: Jul. 16, 2013

(54) PRODUCT MANAGEMENT SYSTEM AND PRODUCT MANAGEMENT METHOD

(75) Inventors: Shigemi Kurashima, Shinagawa (JP); Takashi Yuba, Shinagawa (JP); Masahiro Yanagi, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1122 days.

(21) Appl. No.: 11/826,348

(22) Filed: Jul. 13, 2007

(65) Prior Publication Data

US 2008/0243647 A1   Oct. 2, 2008

(30) Foreign Application Priority Data

Mar. 27, 2007   (JP) ................. 2007-082335

(51) Int. Cl.
*G06Q 10/00* (2012.01)
*G06G 1/14* (2006.01)
*G06Q 30/00* (2012.01)

(52) U.S. Cl.
USPC .............. 705/28; 705/22; 705/26.9; 705/27.1

(58) Field of Classification Search
None
See application file for complete search history.

(56) References Cited

U.S. PATENT DOCUMENTS

| | | | |
|---|---|---|---|
| 5,671,362 A * | 9/1997 | Cowe et al. ............ | 705/28 |
| 6,323,753 B2 * | 11/2001 | Begum ................ | 340/5.91 |
| 6,837,436 B2 * | 1/2005 | Swartz et al. .......... | 235/472.02 |
| 2005/0149414 A1 * | 7/2005 | Schrodt et al. .......... | 705/29 |
| 2005/0187873 A1 * | 8/2005 | Labrou et al. .......... | 705/40 |

FOREIGN PATENT DOCUMENTS

| | | |
|---|---|---|
| JP | 5-94592 | 4/1993 |
| JP | 6-56222 | 3/1994 |
| JP | 10-243847 | 9/1998 |
| JP | 2001-34850 | 2/2001 |
| JP | 2001-128814 | 5/2001 |
| JP | 2001-328710 | 11/2001 |
| JP | 2001328710 | * 11/2001 |
| JP | 2001328710 A | * 11/2001 |
| JP | 2002-304671 | 10/2002 |
| JP | 2005-292909 | 10/2005 |

* cited by examiner

*Primary Examiner* — Ryan Zeender
*Assistant Examiner* — Denisse Ortiz Roman
(74) *Attorney, Agent, or Firm* — Staas & Halsey LLP

(57) ABSTRACT

A product management system is disclosed. The product management system comprises a product detection device disposed on a product display rack and configured to detect presence/absence of a product on the product display rack, a wireless communication device disposed on the product display rack and configured to wirelessly transmit information about the presence/absence of the product detected by the product detection device, a relay device to relay communications between the wireless communication device and a network, a product management device to store and display the information transmitted from the wireless communication device via the relay device and the network, and a terminal device capable of wireless communications with the wireless communication device and configured to travel with a shopper.

11 Claims, 14 Drawing Sheets

FIG.8

| PRODUCT DETECTION DEVICE 110 ID | POSITION INFORMATION P |
|---|---|
| ID1 | P1 |
| ID2 | P2 |
| : | : |

FIG.9

| PRODUCT DETECTION DEVICE 110 ID | PRODUCT INFORMATION F |
|---|---|
| ID1 | F1 |
| ID2 | F2 |
| : | : |

PRODUCT MANAGEMENT SYSTEM AND PRODUCT MANAGEMENT METHOD

BACKGROUND OF THE INVENTION

1. Field of the Invention

The present invention generally relates to a product management system and a product management method, and particularly relates to a product management system and a product management method for controlling the stock on a product display rack in a shopping center or the like.

2. Description of the Related Art

In recent years and continuing, a large amount of products are displayed on product display racks in shopping centers and the like. A number of staff are required to manage such a large amount of products in stock.

There is therefore a demand for a system that allows easy recognition of presence/absence of the products on the product display racks.

A system for recognizing presence/absence of products is disclosed in, for example, Japanese Patent Laid-Open Publication No. 2001-328710, wherein a sensor on a rack reports a stock status to a control center.

Such a conventional system merely reports a stock status to the control center, and does not report presence/absence of products to shoppers. Further, installation of such a system is not easy.

SUMMARY OF THE INVENTION

In view of the foregoing, the present invention is directed to provide a product management system and a product management method that enable easy management of stock status such as out-of-stock conditions, and let shoppers easily know the stock status.

According to an aspect of the present invention, there is provided a product management system that comprises a product detection device disposed on a product display rack and configured to detect presence/absence of a product on the product display rack; a wireless communication device disposed on the product display rack and configured to wirelessly transmit information about the presence/absence of the product detected by the product detection device; a relay device to relay communications between the wireless communication device and a network; a product management device to store and display the information transmitted from the wireless communication device via the relay device and the network; and a terminal device capable of wireless communications with the wireless communication device and configured to travel with a shopper. The product management device transmits the information to the terminal device via the network, the relay device, and the wireless communication device. Then the terminal device displays the information transmitted from the product management device via the network, the relay device, and the wireless communication device.

According to another aspect of the present invention, there is provided a product management method that comprises a step of detecting presence/absence of a product on a product display rack with use of a product detection device disposed on the product display rack; a step of wirelessly transmitting information about the presence/absence of the product to a relay device with use of a wireless communication device disposed on the product display rack; a step of transmitting the information from the relay device to a product management device via a network; a step of causing the product management device to store and display the information transmitted via the relay device and the network and to transmit the information to a terminal device via the network, the relay device, and the wireless communication device; and a step of displaying the information on the terminal device.

It is preferable that the product detection device detect the presence/absence of the product using an infrared sensor. It is also preferable that the product detection device include, on a front side of the product display rack, a passage detection unit that detects placement of the product into and removal of the product from the product display rack so as to detect the presence/absence of the product.

According to still another aspect of the present invention, there is provided a wireless communication device that comprises a receiving unit configured to receive information about presence/absence of a product on a product display rack, the presence/absence of the product being detected by a product detection device disposed on the product display rack; a wireless communication unit configured to wirelessly communicate with a relay device and travel with a shopper, the relay device communicating with a product management device via a network; and a processing unit configured to wirelessly transmit the information about the presence/absence of the product detected by the product detection device to the relay device and to wirelessly transmit, to the terminal device, information transmitted from the product management device via the network and the relay device. It is preferable that the wireless communication unit communicate with the relay device and the terminal device using wireless UWB communications.

In one embodiment of the present invention presence/absence of a product on a product display rack is detected by a product detection device, and information about the presence/absence of the product is transmitted to a product management device via a wireless communication device and a relay device. The product management device stores and displays the information and transmits the information to a terminal device. The terminal device displays the information. This embodiment allows store staff and shoppers to easily identify the product status such as out-of-stock conditions.

BRIEF DESCRIPTION OF THE DRAWINGS

FIG. 8 is a diagram illustrating a data structure of a position information database;

FIG. 9 is a diagram illustrating a data structure of a product information database;

DETAILED DESCRIPTION OF THE PREFERRED EMBODIMENT

Figure 1:
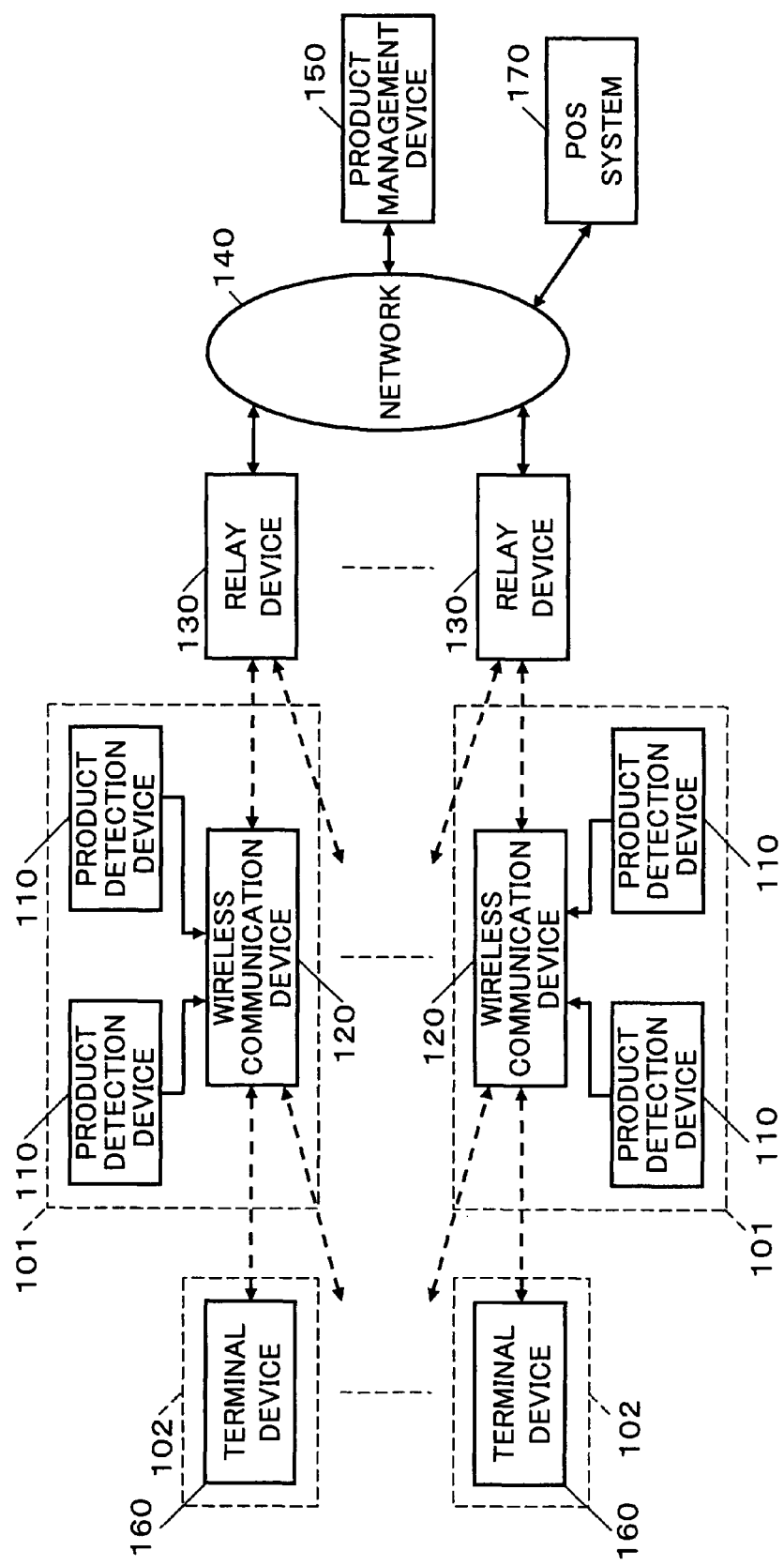
FIG. 1 is a system configuration diagram according to an embodiment of the present invention.

FIG. 1 is a system configuration diagram according to a first embodiment of the present invention.

A product management system 100 of the present embodiment is adapted to detect a product on a product display rack 101 in a shopping center or the like for replenishment of the product. The product management system comprises, at least, a product detection device 110, a wireless communication device 120, a relay device 130, a network 140, and a product management device 150.

The product detection device 110 detects presence/absence of a product on the product display rack 101, and detects placement of a product into and removal of a product from the product display rack. Such information detected by the product detection device 110 is transmitted to the wireless communication device 120.

The wireless communication device 120 is disposed on the product display rack 101 and is adapted to wirelessly transmit the information detected by the product detection device 110 along with position information of the product detection device 110 using, e.g., wireless UWB (Ultra Wideband) communications.

The relay device 130 relays communications between the wireless communication device 120 and the product management device 150. For example, the relay device 130 receives the information wirelessly transmitted from the wireless communication device 120 and transmits the information to the product management device 150 via the network 140.

The product management device 150 receives the information, and displays the status of the product and the position of the corresponding product display rack 101. By referring to the product status and the position of the corresponding product display rack 101 displayed on the product management device 150, store staff can determine the necessity of product replenishment, hot sellers, and movements of shoppers. Thus, the store staff can replenish understocked products and can rearrange the display layout of products.

<Product Detection Device 110>

Figure 2:
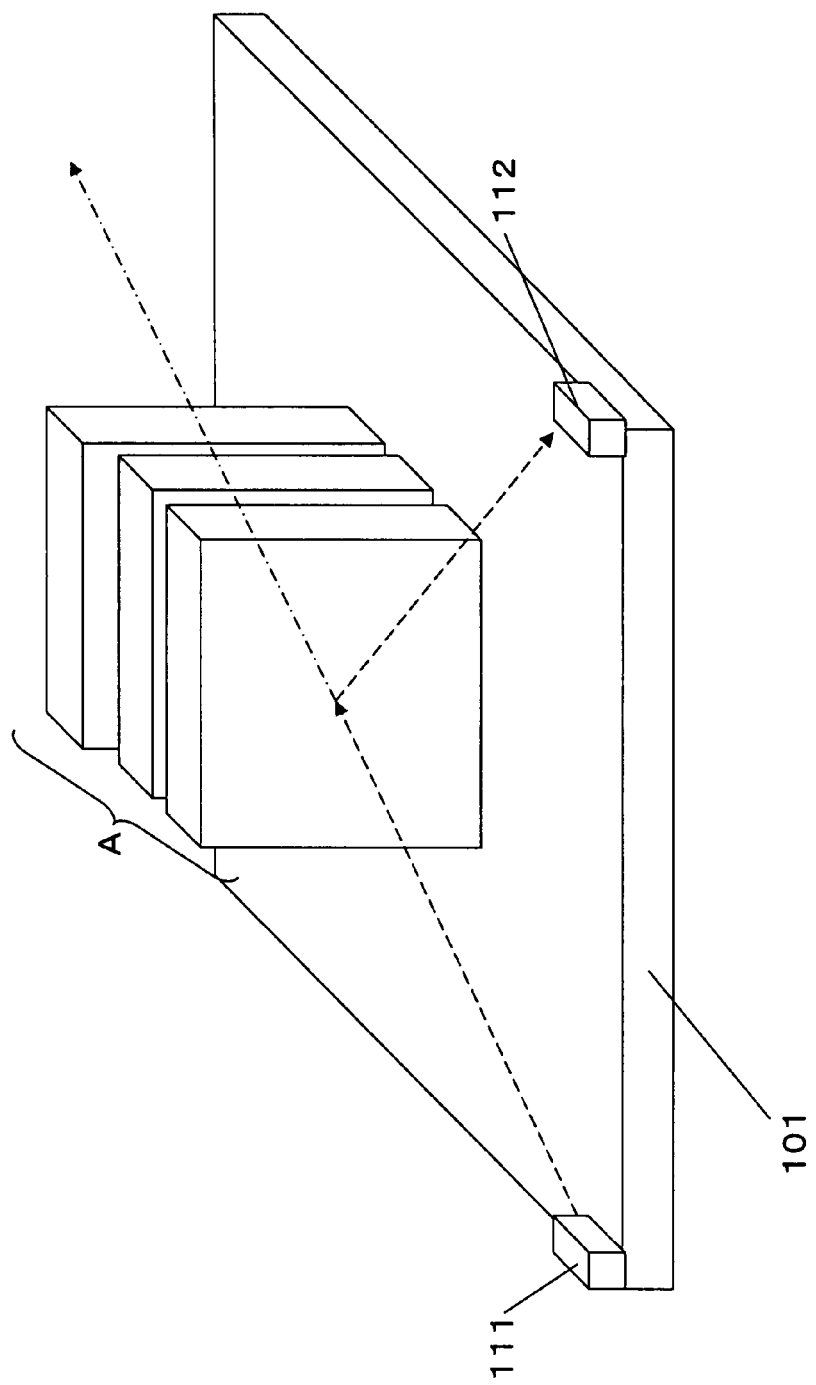
FIG. 2 is a perspective view illustrating a product detection device.
Figure 3:
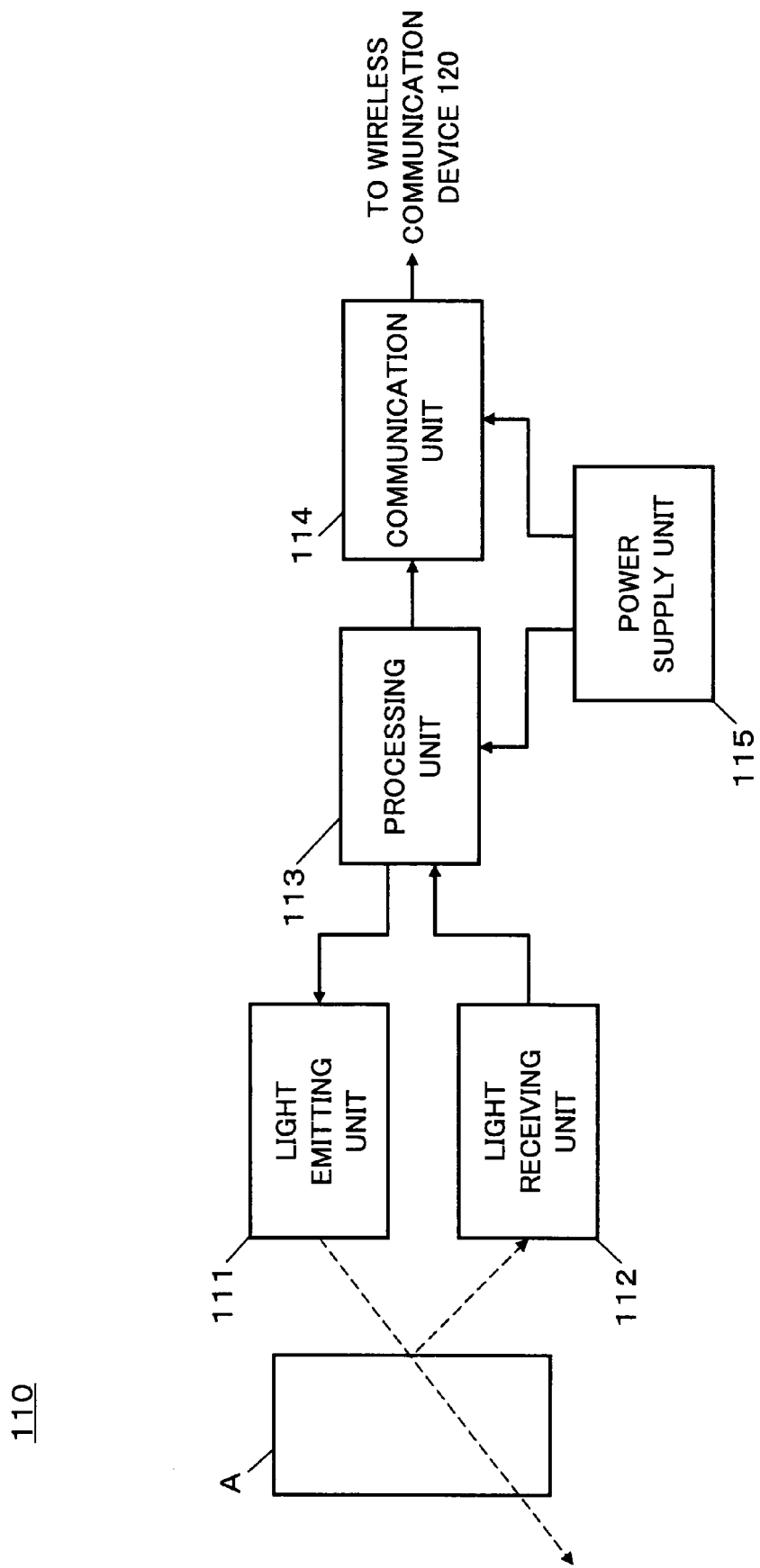
FIG. 3 is a block diagram illustrating a configuration of a product detection device.

FIG. 2 is a perspective view illustrating the product detection device 110, and FIG. 3 is a block diagram illustrating a configuration of the product detection device 110.

The product detection device 110 comprises a light emitting unit 111 and a light receiving unit 112 on the product display rack 101, a processing unit 113, a communication unit 114, and a power supply unit 115. The product detection device 110 is configured to detect presence/absence of a product on the product display rack 101, and send information about the presence/absence of the product to the wireless communication device 120 via the communication unit 114.

The light emitting unit 111 emits light in the direction in which, e.g., products A are placed. If one or more of the product A are present, the light emitted by the light emitting unit 111 is reflected by the product A and is made incident on the light receiving unit 112. The light receiving unit 112 generates an electric signal according to the incident light. The signal generated by the light receiving unit 112 is transmitted to the processing unit 113.

The processing unit 113 determines presence/absence of the product A based on the detection signal transmitted from the light receiving unit 112, and sends the determination result along with an identification number (ID) of the product detection device 110 to the wireless communication device 120. The product detection device 110 performs this product detection processing at regular time intervals. The communication unit 114 is configured to communicate with the wireless communication device 120 based on wired communications. The power supply unit 115 supplies driving power to the processing unit 113, the communication unit 114, etc.

<Wireless Communication Device 120>

Figure 4:
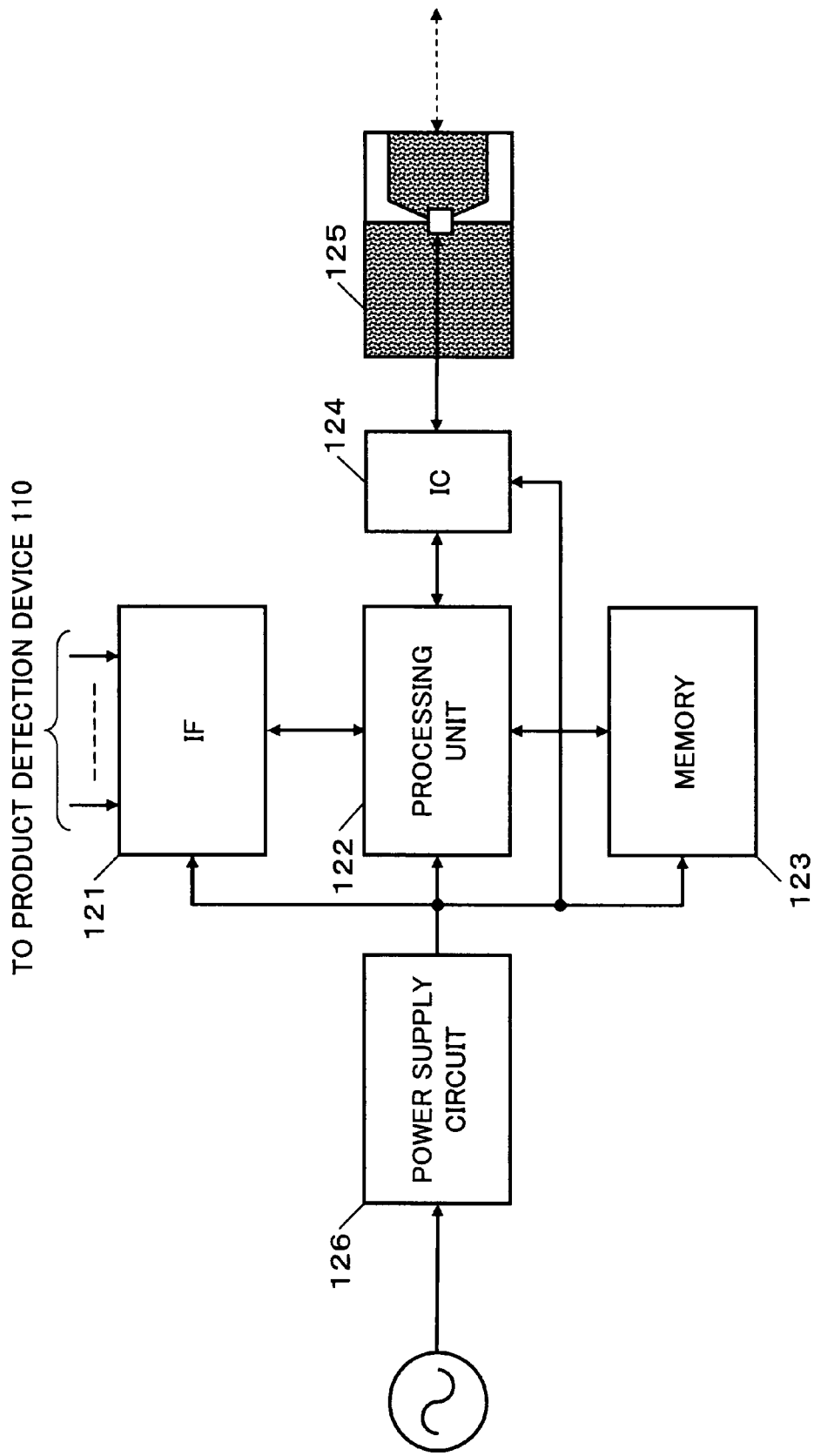
FIG. 4 is a block diagram illustrating a configuration of a wireless communication device.

FIG. 4 is a block diagram illustrating a configuration of the wireless communication device 120.

In this embodiment plural of the wireless communication devices 120 are disposed on the product display racks 101 in a store at regular intervals. Each wireless communication device 120 is connected to at least one product detection device 110, and is capable of wireless UWB communications with the relay device 130 and the terminal device 160. The wireless communication device 120 comprises an interface circuit 121, a processing unit 122, a memory 123, a UWB communication IC chip 124, a UWB antenna unit 125, and a power supply circuit 126. The wireless communication device 120 is configured to transmit information about presence/absence of a product detected by the product detection device 110 to the product management device 150 via the relay device 130 and the network 140, and also to the terminal device 160.

The interface circuit 121 is an interface with the product detection device 110, and is configured to receive a product detection determination result from the product detection device 110. The product detection determination result received by the interface circuit 121 is supplied to the processing unit 122. The processing unit 122 adds an ID for identifying the wireless communication device 120 to the product detection determination result reported by the product detection device 110 and supplies them to the UWB communication IC chip 124. The memory 123 is used as a storage area for storing data processed by the processing unit 122, and includes a table indicating relationships between IDs of the product detection devices 110 and position information items.

The UWB communication IC chip 124 includes a semiconductor chip that performs modulation and demodulation for wireless UWB communications. For instance, the UWB communication chip 124 performs modulation for UWB communications based on the product detection determination result and the position information sent from the processing unit 122, and outputs the modulated result to the UWB antenna unit 125.

The UWB antenna unit 125 is described below.

Figure 5:
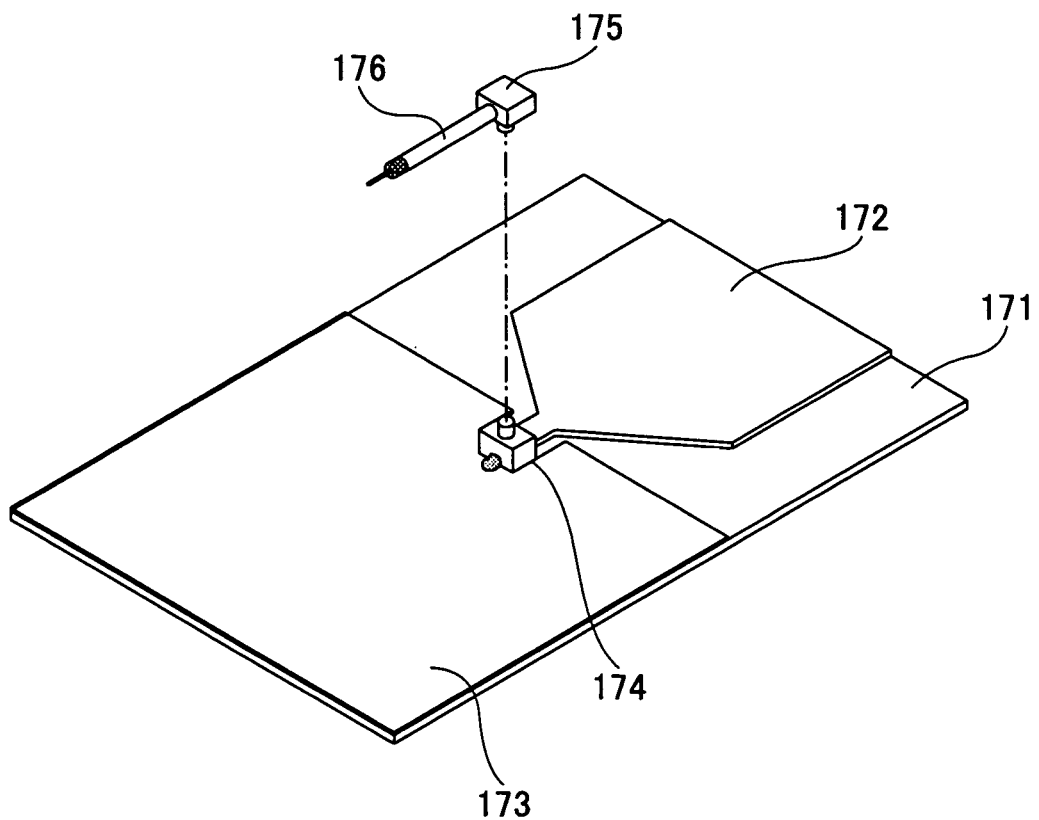
FIG. 5 is a perspective view illustrating a UWB antenna unit.

FIG. 5 is a perspective view illustrating the UWB antenna unit 125.

In the UWB antenna unit 125, an element pattern 172 substantially in the shape of a home plate and a ground pattern 173 abutting the apex of the element pattern 172 are formed on a flexible printed wiring board 171. A surface-mounted socket connector 174 is soldered to the element pattern 172 and the ground pattern 173. The UWB antenna unit 125 is attached to, e.g., the casing of the wireless communication device 120.

A VSWR (Voltage Standing Wave Ratio) characteristic relative to the frequency is determined depending on the angle formed by the sides of the element pattern 172 adjacent to its apex and the side of the ground pattern 173 abutting the apex of the element pattern 172.

Use of the UWB antenna unit 125 with the above-described configuration enables wireless UWB communications. The UWB antenna unit 125 is made thin for easy mounting.

The surface-mounted socket connector 174 is connected to a plug connector 175. A coaxial cable 176 is connected at an end to the plug connector 175 and at the other end to the UWB communication IC chip 124.

The power supply circuit 126 is connected to an AC power source, and is configured to convert AC power to DC power. The power supply circuit 126 generates power for driving the interface circuit 121, the processing unit 122, the memory 123, the UWB communication IC chip 124, etc., and supplies the power to the interface circuit 121, the processing unit 122, the memory 123, and the UWB communication IC chip 124.

The relay device 130 receives a radio signal emitted from the wireless communication device 120 having the above-described configuration.

Figure 6:
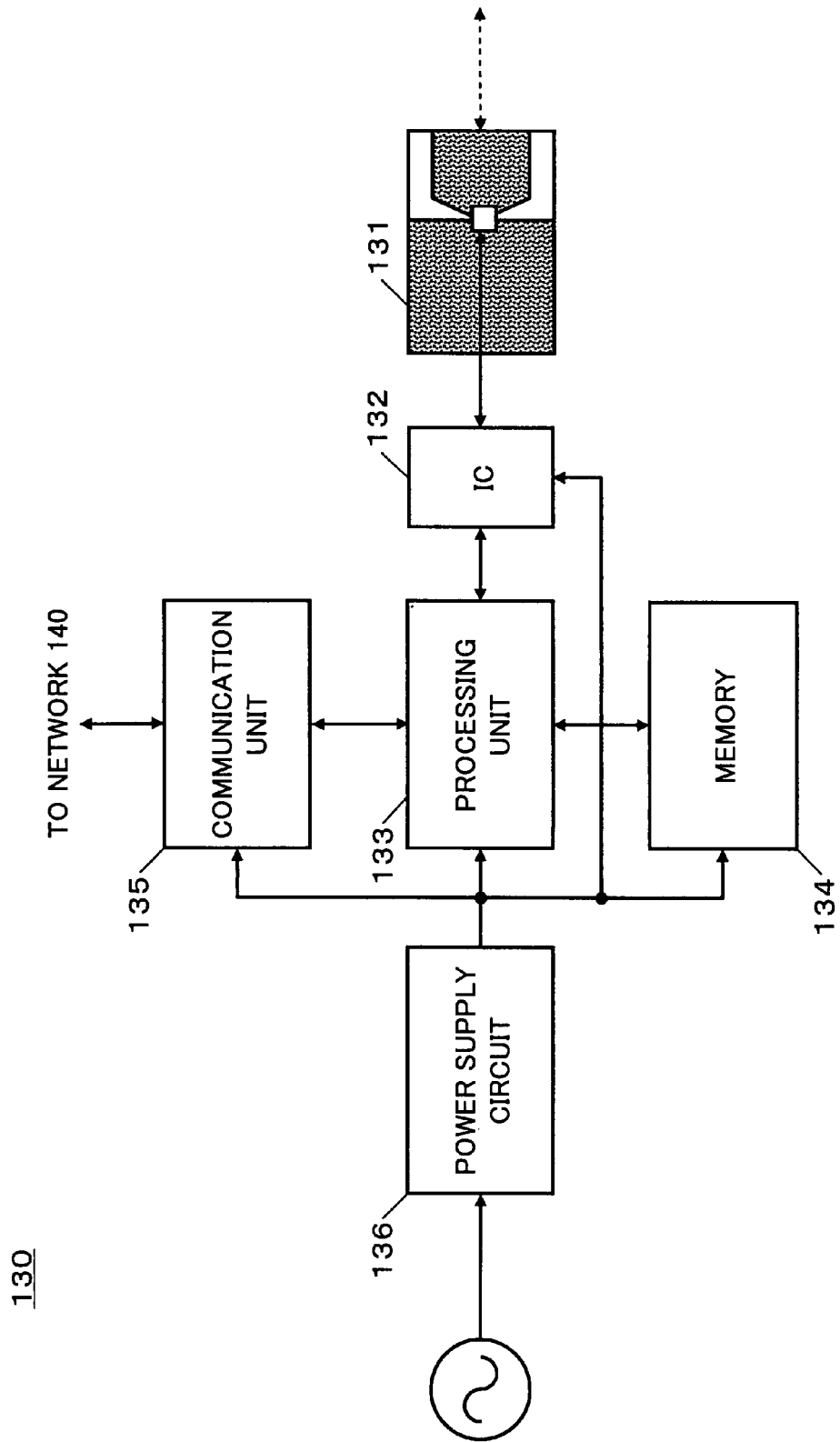
FIG. 6 is a block diagram illustrating a configuration of a relay device.

FIG. 6 is a block diagram illustrating a configuration of the relay device 130.

The relay device 130 comprises a UWB antenna unit 131, a UWB communication IC chip 132, a processing unit 133, a memory 134, a communication unit 135, and a power supply circuit 136. The relay device 130 is configured to communicate with the wireless communication device 120 using wireless UWB communications and communicate with the product management device 150 via the network 140 such as a LAN, thereby relaying communications between the wireless communication device 120 and the product management device 150.

The UWB antenna unit 131 has a configuration similar to the UWB antenna unit 125 of FIG. 5. A signal received by the UWB antenna unit 131 is demodulated by the UWB communication IC chip 132 and is output to the processing unit 132. The processing unit 132 adds an ID of the relay device 130 to the signal received from the wireless communication device 120, and outputs them to the communication unit 135.

The communication unit 135 is configured to communicate with the product management device 150 via the network 140. The memory 134 is used as a storage area for storing data processed by the processing unit 133. The power supply circuit 136 is connected to a commercial power source, and is configured to generate DC power from commercial power. The power supply circuit 136 thus generates power for driving the UWB communication IC chip 132, the processing unit 133, the memory 134, and the communication unit 135, and supplies the driving power to the UWB communication IC chip 132, the processing unit 133, the memory 134, and the communication unit 135.

The product management device 150 is described below.

Figure 7:
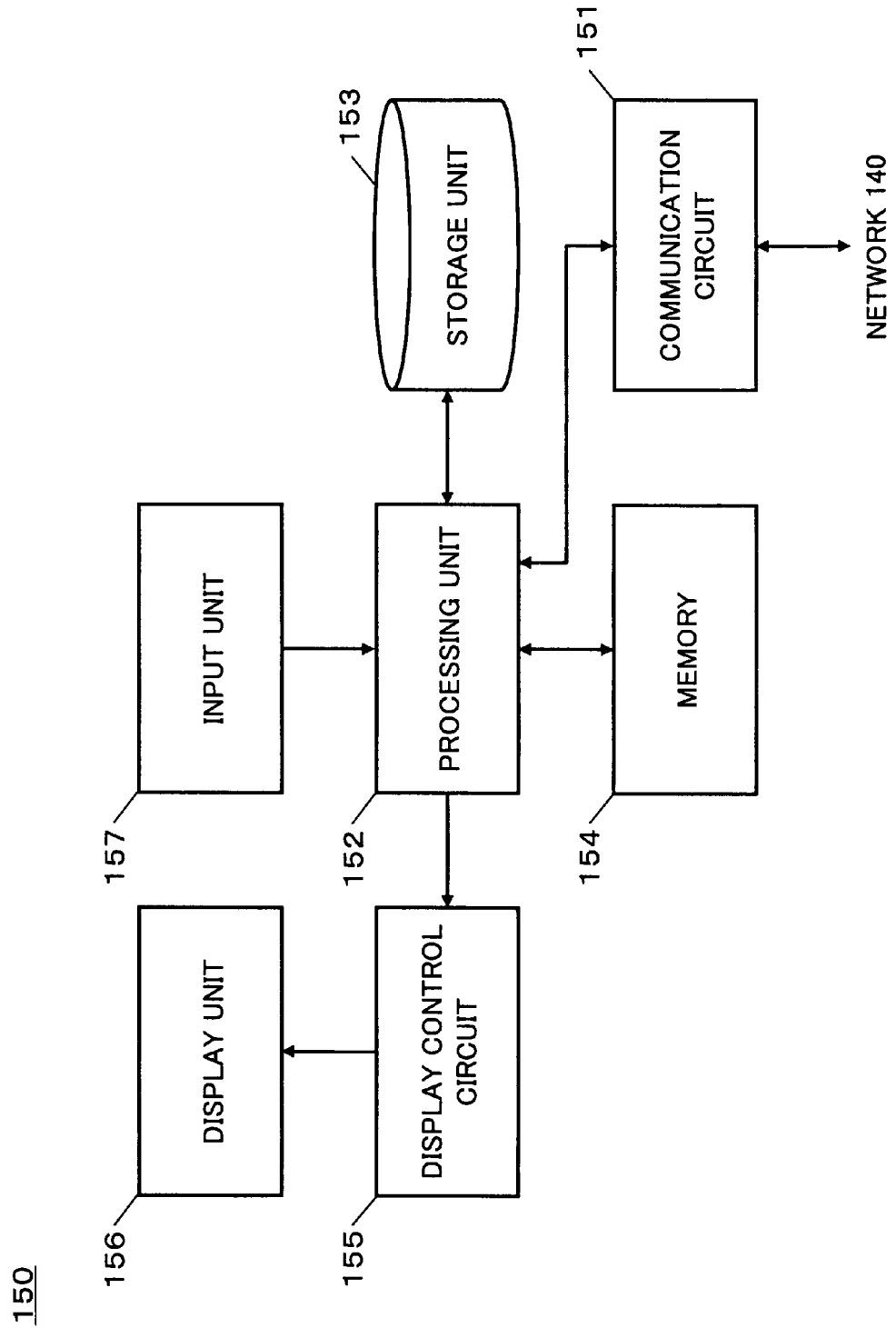
FIG. 7 is a block diagram illustrating a configuration of a product management device.

FIG. 7 is a block diagram illustrating a configuration of the product management device 150.

The product management device 150 includes, e.g., a computer system comprising a communication circuit 151, a processing unit 152, a storage unit 153, a memory 154, a display control unit 155, a display unit 156, and an input unit 157. The product management device 150 is configured to display information about the stock of products on the product display racks 101 based on information sent from the product detection device 110 via the wireless communication device 120, the relay device 130, and the network 140.

The communication circuit 151 is configured to communicate with the relay device 130 via the network 140. The processing unit 152 executes processing according to a product management program installed in, e.g., the storage unit 153.

The memory 154 includes a RAM and a ROM, and is used as a storage area for storing data processed by the processing unit 152. The storage unit 153 includes a hard disk drive in which the product management program is installed. The storage unit 153 stores product management data including a position information database DB1, a product information database DB2, and information about presence/absence of the products on the product display racks 101, which is generated according to the product management program.

FIG. 8 is a diagram illustrating a data structure of the position information database DB1.

The position information database DB1 has a data structure in which ID information of the product detection devices 110 and position information P of the product display racks 101 are stored in combination. Based on the ID of the product detection device 110, a corresponding piece of position information can be obtained from the position information database DB1.

FIG. 9 is a diagram illustrating a data structure of the product information database DB2.

The product information database DB2 has a data structure in which ID information of the product detection devices 110 and product information F are stored in combination. Based on the ID of the product detection device 110, a corresponding piece of product information can be obtained from the product information database DB2.

The processing unit 152 refers to the position information database DB1 and the product information database DB2 based on the ID of a product detection device 110 contained in a product detection determination result and acquires a corresponding piece of position information P and a corresponding piece of product information F, and causes the display unit 156 to display the acquired position information P and the product information F along with the product detection result.

The display control unit 155 controls the display unit 156 based on information about presence/absence of a product on the product display rack 101 generated according to the product management program so as to display the presence/absence of the product on the product display rack 101 on the display unit 156. The display unit 156 includes an LCD or a CRT, and is configured to display the presence/absence of the product on the product display rack 101 under the control of the display control unit 155. The input unit 157 includes a keyboard and a mouse, and is used for entering data, commands, etc.

The store staff can easily identify the presence/absence of the product on the product display rack 101 by referring to the information displayed on the display unit 156 of the product management device 150.

The terminal device 160 is described below.

Figure 10:
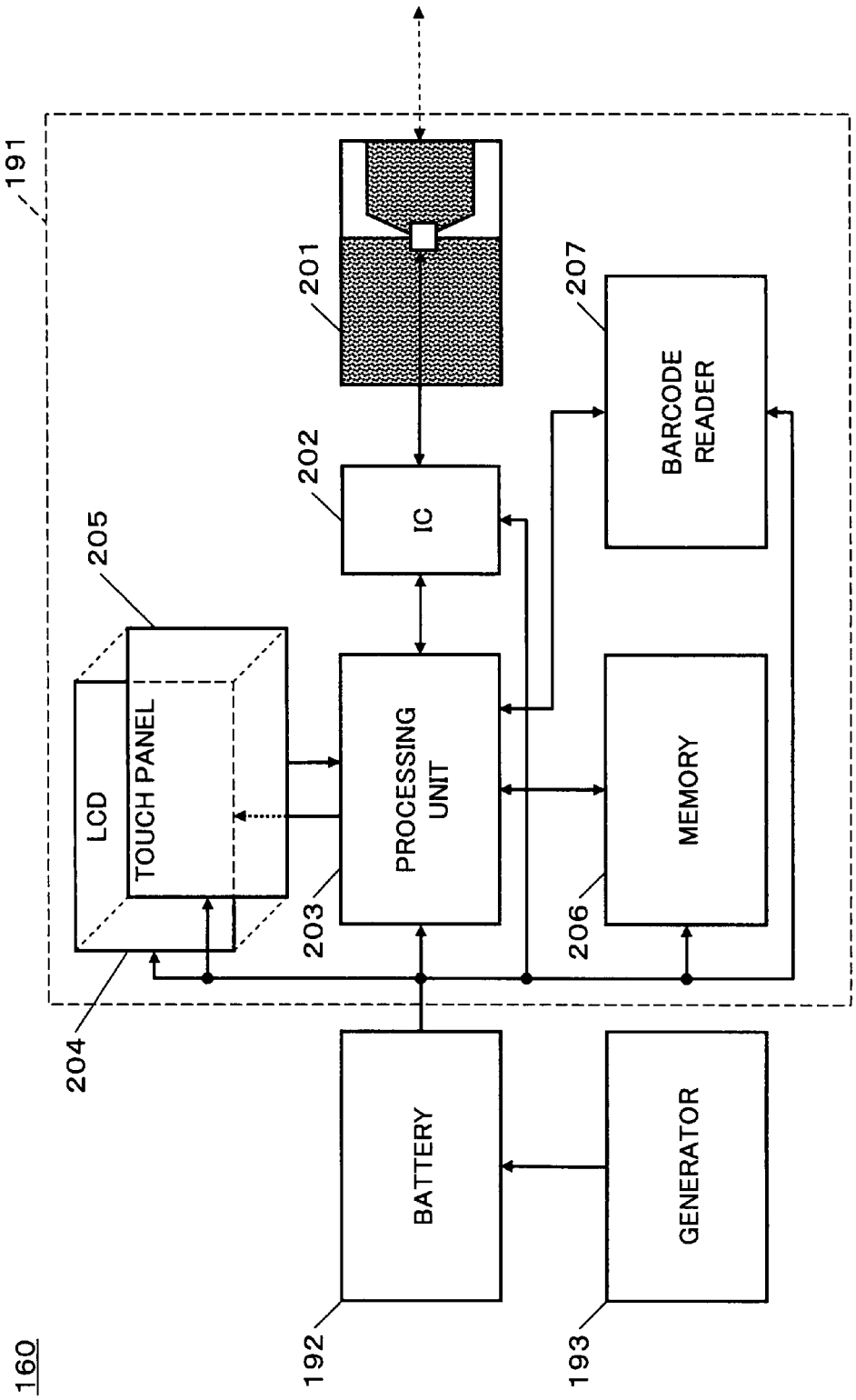
FIG. 10 is a block diagram illustrating a configuration of a terminal device.
Figure 11:
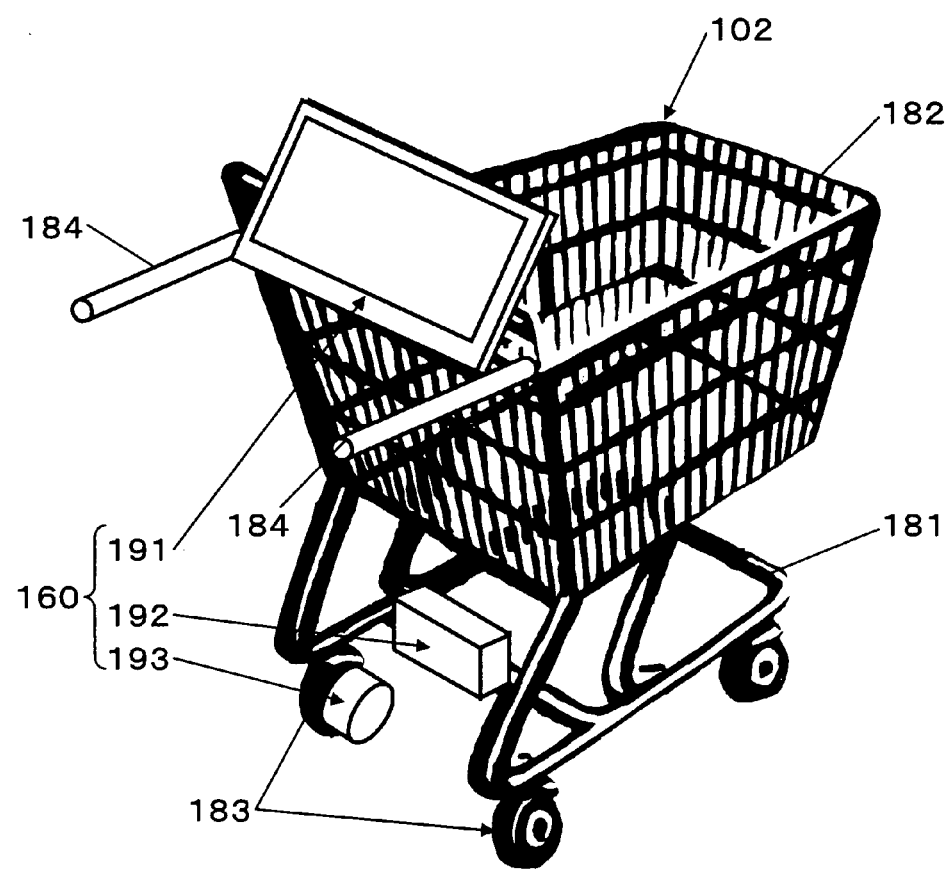
FIG. 11 is a perspective view illustrating a cart.

FIG. 10 is a block diagram illustrating the terminal device 160, and FIG. 11 is a perspective view illustrating a cart 102.

The terminal device 160 is attached to the cart 102, in which a shopper put products, so as to travel with the cart 102 through a store. The cart 102 comprises a base 181, a basket 182, wheels 183, and handles 184. The terminal device 160 may be fixed to the basket 182 between the handles 184 of the cart 102.

The terminal device 160 comprises a device main body 191, a battery 192, and a generator 193. The terminal device 160 is configured to communicate with the wireless communication device 120 and display, on a display unit 204, information about presence/absence of a product on the product display rack 101 transmitted from the wireless communication device 120, thereby reporting to a shopper the presence/absence of the product.

The device main body 191 comprises a UWB antenna unit 201, a UWB communication IC chip 202, a processing unit 203, the display unit 204, a touch panel 205, a memory 206, and a barcode reader 207.

The UWB antenna unit 201 has a configuration similar to the UWB antenna unit 125 of FIG. 5, and supports wireless UWB communications. The UWB antenna unit 201 is connected to the UWB communication IC chip 202.

The UWB antenna unit 201 sends and receives impulses. The UWB communication IC chip 202 performs modulation according to a signal received from the processing unit 203 and outputs the modulated result to the UWB antenna unit 201. Further, the UWB communication IC chip 202 demodulates a signal received from the UWB antenna unit 201 and outputs the demodulated signal to the processing unit 203.

The processing unit 203 executes processing according to a terminal device control program. The display unit 204 includes a liquid crystal panel, for example, and is configured to display the information about the presence/absence of the product on the product display rack 101, which has been sent from the wireless communication device 120, under the control of the processing unit 203.

The touch panel 205 is disposed in front of the display screen of the display unit 204, and is operable by shoppers. The processing unit 203 performs various operations, such as switching screens, based on operations on the touch panel 205.

The memory 206 includes a RAM and a ROM, in which the terminal device control program to be executed by the processing unit 203 is installed. The memory 206 is also used as a storage area for storing data processed by the processing unit 203.

The barcode reader 207 reads a barcode attached to or printed on a product, a coupon, or the like, and sends the read barcode to the processing unit 203. The processing unit 203 communicates with a POS system 170 (FIG. 1) via the network 140 and performs processing such as billing according to the read barcode. Thus, payment is made during shopping, thereby eliminating the need to pay at the cash register.

The battery 192 is mounted on the base 181 of the cart 102 and supplies power to the device main body 191. The generator 193 generates electric power through rotation of the wheels 183 during travel of the cart 102. The electric power generated by the generator 193 is supplied to the battery 192. The battery 192 is charged with the electric power supplied from the generator 193.

In this embodiment, shoppers can recognize presence/absence of products on the product display rack on the display unit 204 of the terminal device 160.

The processing by the product management system 100 is described below.

Figure 12:
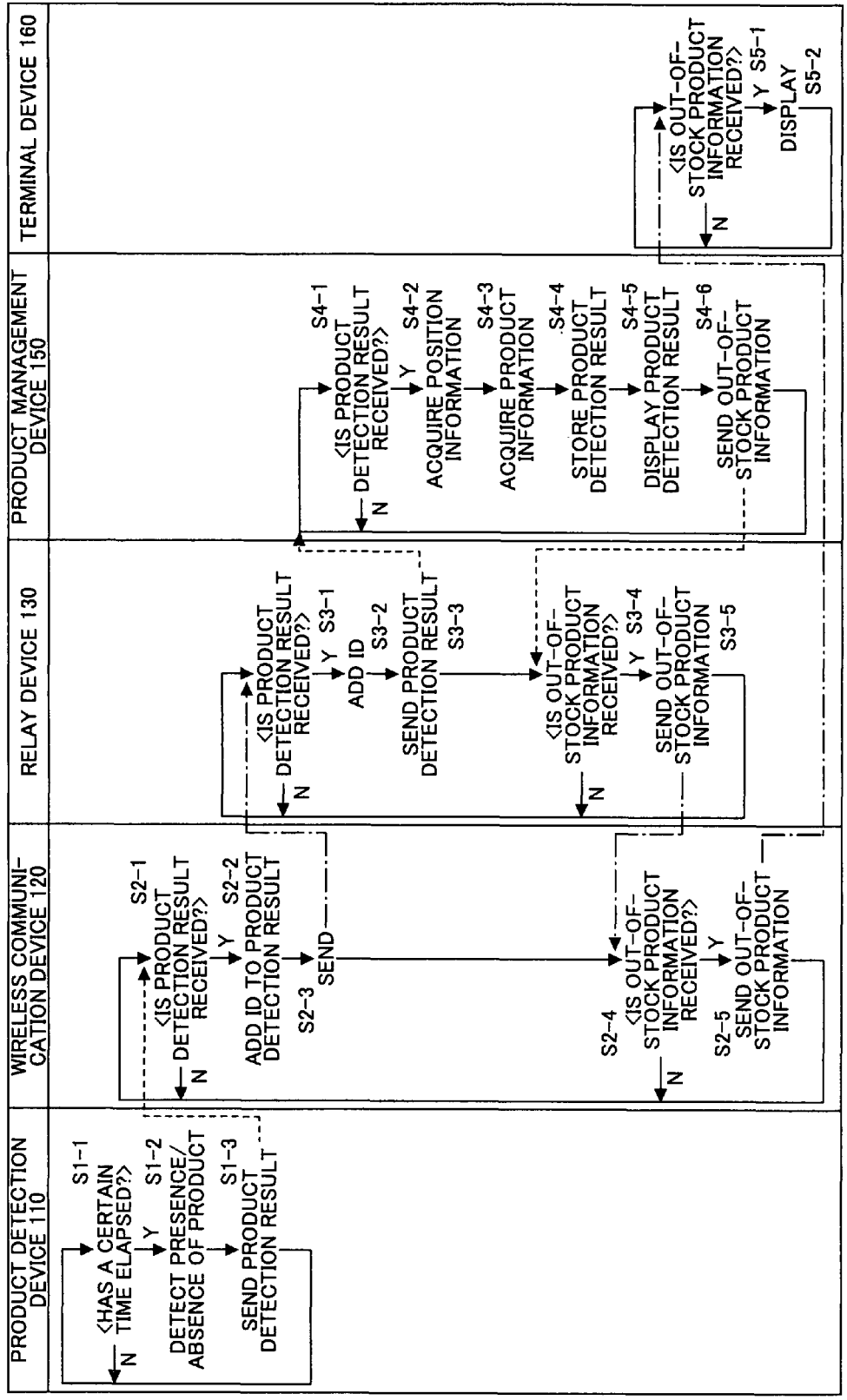
FIG. 12 is a flowchart illustrating processing by a product management system.

FIG. 12 is a flowchart illustrating processing by the product management system 100.

If a certain time has elapsed in Step S1-1, the product detection device 110 detects presence/absence of a product in Step S1-2, and sends the product detection result to the wireless communication device 120 along with an ID for identifying the product detection device 110 in Step S1-3.

If the wireless communication device 120 receives the product detection result from the product detection device 110 in step S2-1, the wireless communication device 120 adds an ID of the wireless communication device 120 to the product detection result in Step S2-2, and sends the product detection result containing the ID based on wireless UWB communications in Step S2-3.

If the relay device 130 receives the product detection result from the wireless communication device 120 in Step S3-1, the relay device 130 adds an ID of the relay device 130 to the product detection result in Step S3-2, and sends the product detection result containing the ID to the product management device 150 via the network 140 in Step S3-3.

If the product management device 150 receives the product detection result from the relay device 130 in Step S4-1, then, based on the ID of the product detection device 110 contained in the product detection result, the product management device 150 refers to the position information database DB1 in the storage unit 153 to acquire position information of the product display rack 101 for displaying the product in Step S4-2, and refers to the product information database DB2 in the storage unit 153 to acquire product information in Step S4-3.

The product management device 150 stores the acquired position information and product information in a manner associated with each other in Step S4-4, and displays the product detection result along with the stored information on the display unit 156 in Step S4-5.

Figure 13:
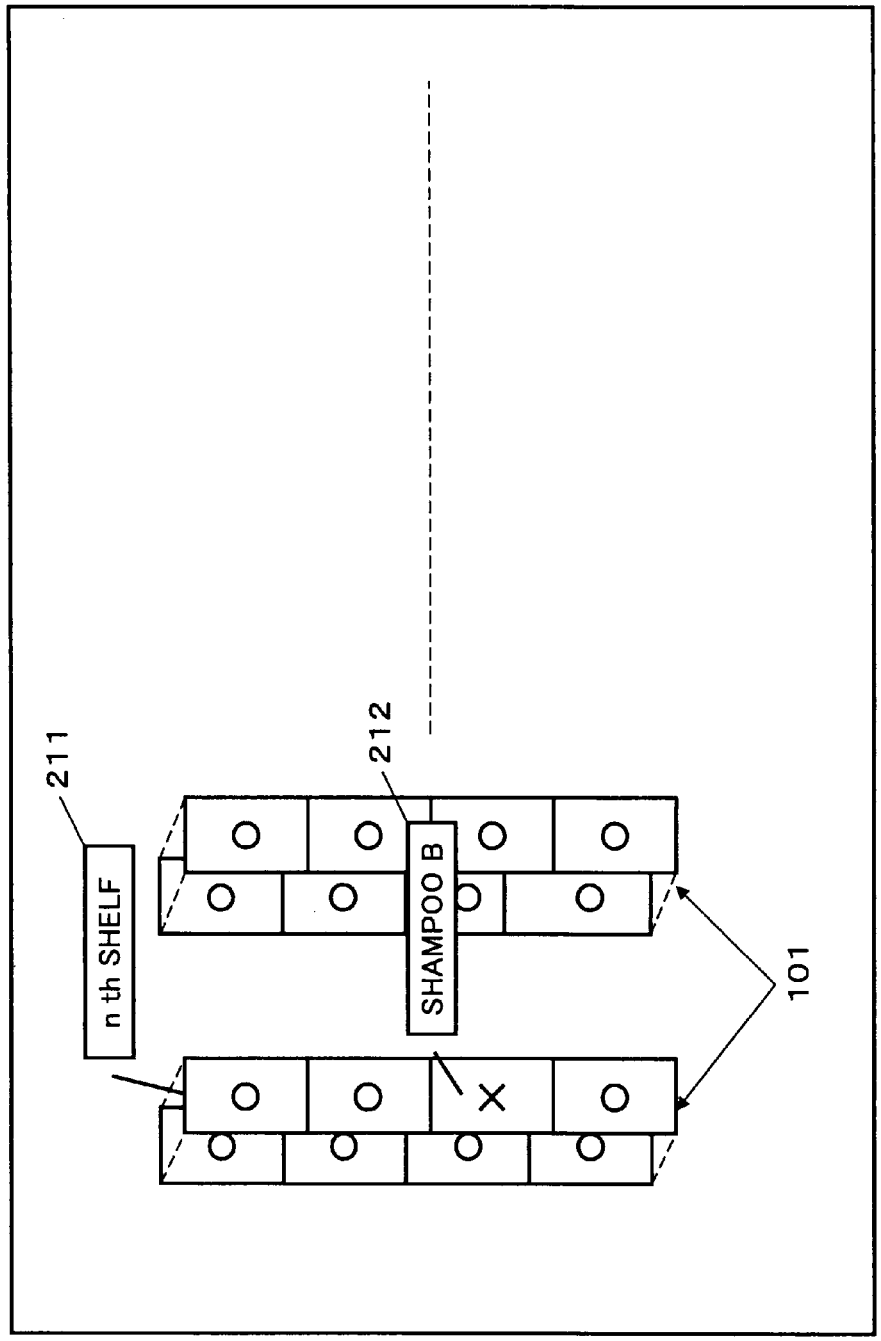
FIG. 13 shows an example of a product detection result screen.

FIG. 13 shows an example of a product detection result screen.

The display unit 156 displays the product detection result screen of FIG. 13, for example. The product detection result screen graphically shows the product display rack 101. An indicator 211 shows the number of the shelf. In this example, the symbol "o" indicates presence of a product, while the symbol "x" indicates absence of a product. An indicator 212 is displayed in a position where no product is placed. The indicator 212 shows product information of a product that is supposed to be placed there.

It is to be noted that FIG. 13 shows merely an example of a product detection result screen. The product detection result screen is not limited thereto and may include any screens that show presence/absence of products.

In Step S4-6 the product management device 150 sends information about a product out of stock to the relay device 130. If the relay device 130 receives the information about the out-of-stock product from the product management device 150 in Step S3-4, the relay device 130 sends the received information to the wireless communication device 120 in Step S3-5.

If the wireless communication device 120 receives the information about the out-of-stock product from the product management device 150 in Step S2-4, the wireless communication device 120 sends the received information to the terminal device 160 using wireless UWB communications in Step S2-5. If the terminal device 160 receives the out-of-stock product information from the wireless communication device 120 in Step S5-1, the terminal device 160 displays the out-of-stock product information on the display unit 204 in Step S5-2.

Shoppers can know the out-of-stock product on the display unit 204 of the terminal device 160. The product management device 150 may provide information about when the stock will be replenished.

Although the product detection device 110 of this embodiment detects presence/absence of products, the product detection device 110 is not limited thereto and may detect a hand of a person put into and pulled out of the product display rack 101.

Figure 14:
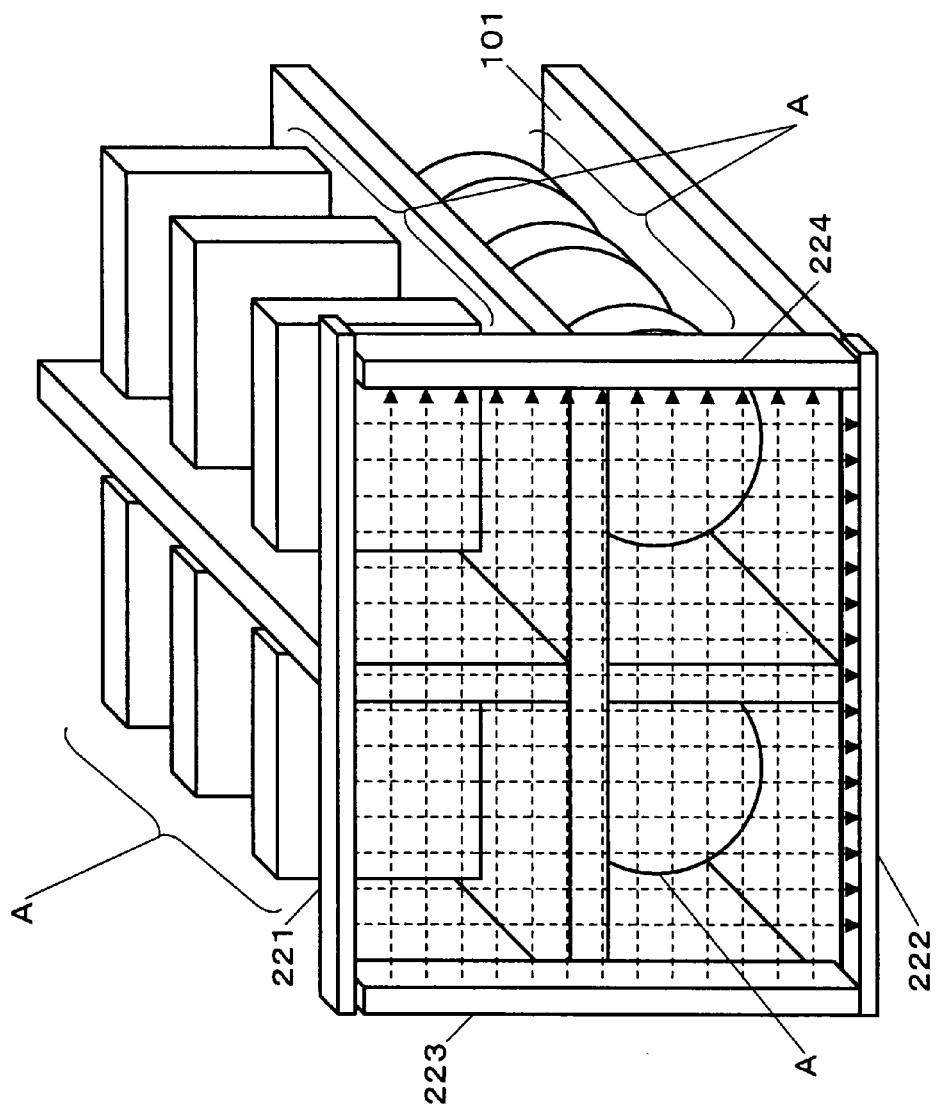
FIG. 14 is a perspective view illustrating a modified product detection device.
Figure 15:
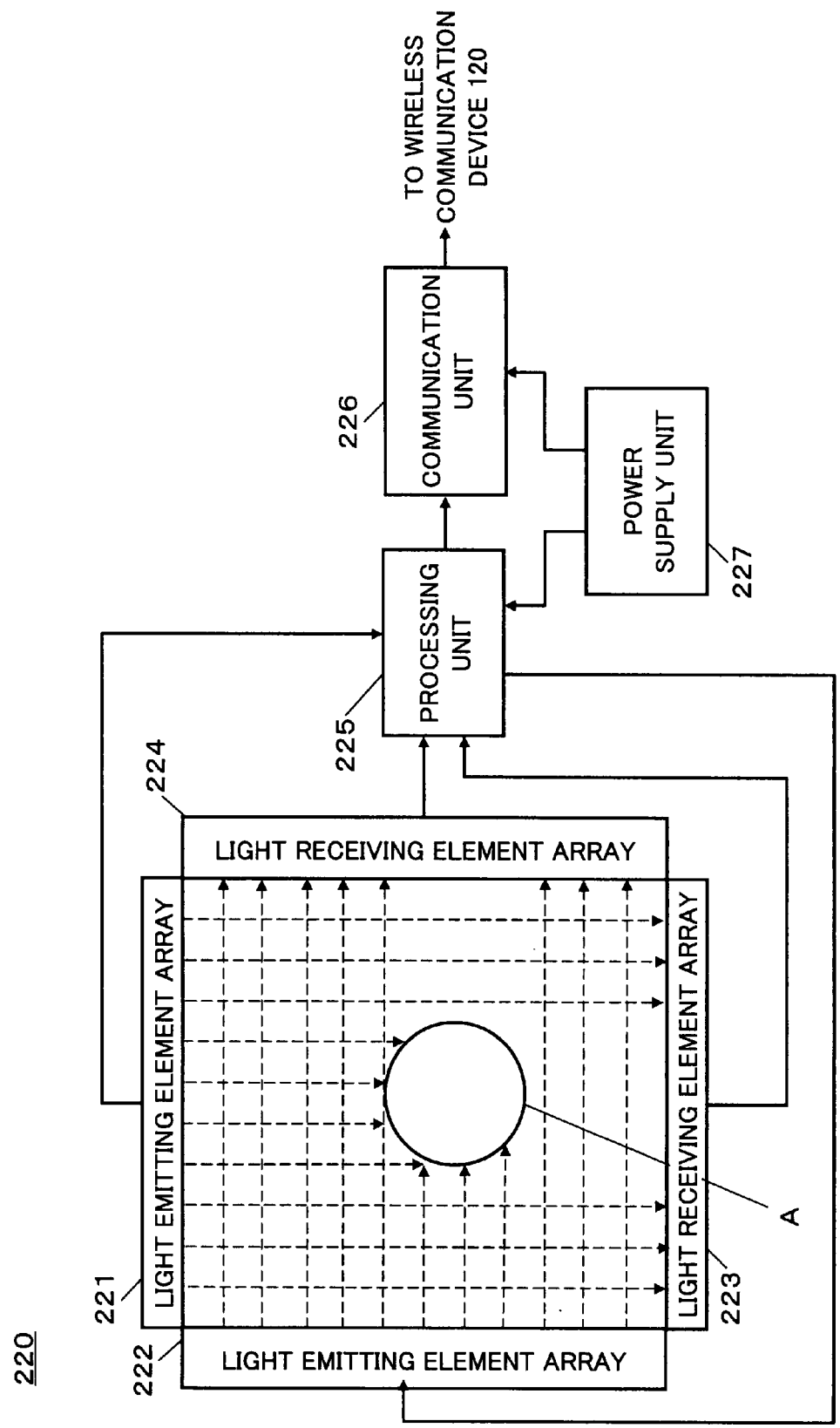
FIG. 15 is a block diagram illustrating a configuration of a modified product detection device.

FIG. 14 is a perspective view illustrating a modified example of the product detection device 110, and FIG. 15 is a block diagram illustrating a configuration of a modified example of the product detection device 110.

A modified product detection device 220 includes light emitting element arrays 221 and 222, light receiving element arrays 223 and 224, a processing unit 225, a communication unit 226, and a power supply unit 227.

The light emitting element array 221 is disposed on the upper front edge of the product display rack 101, and is configured to emit light downward. The light emitting element array 222 is disposed on the front left edge of the product display rack 101, and is configured to emit light rightward.

The light receiving element array 223 is disposed on the lower front edge of the product display rack 101, and is configured to receive the light coming from the upper side, convert the light into an electric signal, and send the electric signal to the processing unit 225. The light receiving element array 224 is disposed on the front right edge of the product display rack 101, and is configured to receive the light coming from the left side, convert the light into an electric signal, and send the electric signal to the processing unit 225.

The processing unit 225 specifies the position of a hand of a person put into or pulled out of the product display rack 101, and sends information about the position to the wireless communication device 120 via the communication unit 226.

The wireless communication device 120 sends the position information received from the product detection device 220 to the product management device 150 via the relay device 130 and the network 140. The product management device 150 detects placement of a product into or removal of a product from the product display rack 101 based on the received position information, and determines whether the product is out of stock. For example, suppose that a predetermined number of products are placed on the product display rack 101. If removal of the product is detected the same number of times as the number of the products, the product is determined to be out of stock.

The product management device 150 may identify hot sellers or the product display rack 101 on which hot sellers are placed by managing information about placement/removal of products or by specifying out-of-stock products or high traffic products, and provide such information as marketing information.

While the present invention is described in terms of preferred embodiments, it will be apparent to those skilled in the art that variations and modifications may be made without departing from the scope of the invention.

The present application is based on Japanese Priority Application No. 2007-082335 filed on Mar. 27, 2007, with the Japanese Patent Office, the entire contents of which are hereby incorporated by reference.

What is claimed is:

1. A product management system, comprising:
a product detection device disposed on a product display rack and configured to detect presence/absence of a product on the product display rack;
a wireless communication device disposed on the product display rack and configured to wirelessly transmit information about the presence/absence of the product detected by the product detection device;
a relay device to relay communication between the wireless communication device and a network;
a product management device to store and display the information about the presence/absence of the product transmitted from the wireless communication device via the relay device and the network, and provide information about when the product will be replenished; and
a terminal device detached from the product detection device, the wireless communication device, and the product display rack, said terminal device being capable of wireless communications with the wireless communication device and configured to travel with a shopper, wherein the product detection device detects a hand of a person put into or pulled out of the product display rack, wherein the product management device transmits the information about the presence/absence of the product detected by the product detection device and the information about when the product will be replenished to the terminal device via the network, the relay device, and the wireless communication device; and
the terminal device displays the information about the presence/absence of the product detected by the product detection device and the information about when the product will be replenished on a display screen provided on the terminal device, said information being transmitted from the product management device via the network, the relay device, and the wireless communication device, said terminal device including a touch panel for the shopper to operate the display screen, a barcode reader for reading a barcode, and a processing unit for processing a billing process according to information based on the barcode read by the barcode reader during shopping.

2. The product management system as claimed in claim 1, wherein the wireless communication device communicates with the product management device and the terminal device using wireless UWB communications.

3. The product management system as claimed in claim 1, wherein the terminal device is mounted on a shopping cart.

4. The product management system as claimed in claim 1, wherein the product detection device detects the presence/absence of the product using an infrared sensor.

5. The product management system as claimed in claim 1, wherein the product detection device includes, on a front side of the product display rack, a passage detection unit that detects placement of the product into and removal of the product from the product display rack so as to detect the presence/absence of the product.

6. A product management method, comprising the steps of:
detecting presence/absence of a product on a product display rack with use of a product detection device disposed on the product display rack;
wirelessly transmitting information about the presence/absence of the product to a relay device with use of a wireless communication device disposed on the product display rack;
transmitting the information about the presence/absence of the product from the relay device to a product management device via a network;
detaching a terminal device from the product detection device, the wireless communication device, and the product display rack;
causing the product management device to store and display the information about the presence/absence of the product transmitted via the relay device and the network, to provide information about when the product will be replenished, and to transmit the information to the terminal device via the network, the relay device, and the wireless communication device; and
displaying the information about the presence/absence of the product detected by the product detection device and the information about when the product will be replenished on the terminal device on a display screen provided on the terminal device, said information about the presence/absence of the product and the information about when the product will be replenished being transmitted from the product management device via the network, the relay device, and the wireless communication device, said terminal device including a touch panel for a shopper to operate the display screen, a barcode reader for reading a barcode, and a processing unit for processing a billing process according to information based on the barcode read by the barcode reader during shopping; and detecting a hand of a person put into or pulled out of the product display rack.

7. The product management method as claimed in claim 6, wherein the wireless communication device communicates with the product management device and the terminal device using wireless UWB communications.

8. The product management method as claimed in claim 6, wherein the terminal device is mounted on a shopping cart.

9. A wireless communication device, comprising:
- a receiving unit configured to receive information about presence/absence of a product on a product display rack, the presence/absence of the product being detected by a product detection device disposed on the product display rack;
- a wireless communication unit configured to wirelessly communicate with a relay device and travel with a shopper, the relay device communicating with a product management device via a network;
- a terminal device detached from the product detection device, the wireless communication unit, and the product display rack;
- a processing unit configured to wirelessly transmit the information about the presence/absence of the product detected by the product detection device to the relay device and to wirelessly transmit, to the terminal device, the information about the presence/absence of the product and information about when the product will be replenished transmitted from the product management device via the network and the relay device;
- the terminal device displaying the information about the presence/absence of the product detected by the product detection device and the information about when the product will be replenished on a display screen provided on the terminal device, the information about the presence/absence of the product detected by the product detection device and the information about when the product will be replenished being transmitted from the product management device via the network, the relay device, and the wireless communication device, said terminal device including a touch panel for the shopper to operate the display screen, a barcode reader for reading a barcode, and a processing unit for processing a billing process according to information based on the barcode read by the barcode reader during shopping; and
- the receiving unit configured to receive information about a hand of a person put into or pulled out of the product display rack and being detected by the product detection device disposed on the product display rack.

10. The wireless communication device as claimed in claim 9, wherein the wireless communication unit communicates with the relay device and the terminal device using wireless UWB communications.

11. The product management system according to claim 1, wherein the terminal device further includes a battery for storing electricity for the terminal device, and a generator for generating the electricity through rotation of wheels provided to the terminal device and charging the battery with the electricity.

* * * * *